United States Patent [19]

Kalverkamp

[11] Patent Number: 4,741,481
[45] Date of Patent: May 3, 1988

[54] APPARATUS AND METHOD FOR THE COMMINUTION OF PLANT MATTER

[76] Inventor: Klemens Kalverkamp, Possenbrock 29, D-4730 Ahlen/Westf., Fed. Rep. of Germany

[21] Appl. No.: 606,669

[22] Filed: May 3, 1984

[30] Foreign Application Priority Data

May 3, 1983 [DE] Fed. Rep. of Germany ....... 3316142

[51] Int. Cl.$^4$ .............................................. B02C 19/00
[52] U.S. Cl. .................................. 241/29; 241/101.7; 241/293
[58] Field of Search ................ 241/101.7, 29, 285 A, 241/242, 285 B, 243, 292.1, 293, 300.1, 82, 30, 28, 294

[56] References Cited

U.S. PATENT DOCUMENTS

| | | | |
|---|---|---|---|
| 1,088,085 | 2/1914 | McLean | 241/294 |
| 2,077,247 | 4/1937 | McLean | 241/294 |
| 2,405,692 | 8/1946 | Hall | 241/242 X |
| 2,853,247 | 9/1958 | Anderson | 241/294 X |
| 4,106,708 | 8/1978 | Kropa | 241/242 X |

FOREIGN PATENT DOCUMENTS

| | | | |
|---|---|---|---|
| 371352 | 3/1939 | Italy | 241/242 |
| 280452 | 11/1927 | United Kingdom | 241/82 |

*Primary Examiner*—Mark Rosenbaum
*Attorney, Agent, or Firm*—Hill, Van Santen, Steadman & Simpson

[57] ABSTRACT

An apparatus and method for the comminution of plant matter, particularly of moist plant matter, for the production of corn cob mix, for example, provides that a rotor is rotationally mounted in a housing and provided with a drive, the rotor carrying movable blades and the housing carrying stationary blades so that there is a mutual interaction of the blades for comminution. The moving blades are slanted back in the direction of motion of the rotor. The blades are formed of sheet steel preferably manufactured by punching and have a thickness of 0.3 through 3 mm, preferably 0.5 through 1 mm. The comminution occurs in such a manner that the plant matter is non-uniformly accelerated and pre-comminuted between a plurality of high-speed intercutters moving a circular orbit and is finish-comminuted by a plurality of outer-stationary cutters.

32 Claims, 4 Drawing Sheets

APPARATUS AND METHOD FOR THE COMMINUTION OF PLANT MATTER

CROSS REFERENCE TO RELATED APPLICATION

This application is related to application Ser. No. 606,666, filed on even date herewith, now abandoned.

BACKGROUND OF THE INVENTION

1. Field of the Invention

The present invention relates to an apparatus and to a method for the comminution of plant matter, particularly of moist plant matter, for example for producing corn cob mix.

2. Description of the Prior Art

Corn cob mix is a product which is tough and tends toward clump formation in its comminuted state which, as a result of its high moisture and protein content, forms a sticky mass which presents great difficulties in machine comminution.

Corn cob mix contains ground and/or shredded corn harvested before it is actually ripe whose cob and plant matter is comminuted as a whole and which is processed into a high-grade animal feed by the addition of grain, protein concentrate and, under given conditions, mineral substances during or, respectively, after the comminution, as the case may be.

It is of significance for the mix that complete homogeneity be achieved, since some feed recipients would otherwise receive specific substances in a too low of a concentration and others in a too high of a concentration. The plant matter must be very finely comminuted for this reason.

It is known in the art to employ high-speed hammer mills with or, respectively, without bottom grates for the comminution of plant matter for corn cob mix. Considerable difficulties occur due to the properties of the plant matter to tend toward caking and conglutation. Relatively heavy and complicated machine units having extremely high drive powers in comparison to the comminution work must be employed in order to overcome these difficulties. Since the plant matter is most difficult to process in the state of its highest protein content before it is ripe, riper plant matter has frequently been processed in order to overcome the mechanical difficulties at the expense of the protein content.

A particular disadvantage of the mills heretofore employed occurs due to luting or loading of the strainers or bottom grates. As a result thereof, the already high power consumption of the hammer mills is further increased with a deteriorating comminution performance.

The power consumption also continues to increase progressively when, as a consequence of unavoidable wear, the beater edges of the beater blades or, respectively, of the flails and/or of the grate bars become blunted.

SUMMARY OF THE INVENTION

The object of the present invention is to overcome the difficulties arising in the comminution of moist plant matter and to provide a method or, respectively, an apparatus optimally suited to this purpose which permits the plant matter to be comminuted to the desired degree with a considerably reduced drive power and without deterioration due to the clump-forming and sticky properties thereof. The apparatus should be uncomplicated and form a transportable or, respectively, mobile machine unit which is suitable for attachment to and/or drive by an agricultural field vehicle or, respectively, tractor vehicle. The cutting power and power consumption of the apparatus should also be available without disadvantageous changes over longer operating times.

The above object is achieved, according to the present invention, by an apparatus which is a cutter apparatus equipped with moving and stationary, mutually interacting blades, whereby the moving blades are disposed at outside surfaces of a rotor and the stationary blades are disposed at inside surfaces of a housing. As a result of the interaction of moving and stationary blades due to the employment of a cutter unit instead of hammer mills or rebound crushers, a pure cutting operation which is not vitiated by sticky or clotting properties of the material advantageously derives, whereby the desired degree of comminution is achieved with a significantly reduced drive power in comparison to hammer mills, even under the least favorable comminution conditions.

According to a feature of the invention, the moving blades are slanted back in the direction of motion of the rotor, whereby their cutters form tangential lines at an imaginary circle that is concentric to the axis of rotation. The plant matter can therefore be advantageously processed without difficulty in the condition of its highest protein content, regardless of how moist and sticky it may be. Advantageously added thereto is that the employed cutter apparatus has considerably lower weight than a powerfully and heavily designed hammer mill, for which reason the apparatus of the present invention is suitable for attachment to an agricultural vehicle as a transportable or mobile machine unit.

A cutting operation which corresponds to that of a scissors is achieved, whereby an optimum cutting effect with the lowest power consumption is advantageously obtained, on the one hand, and, on the other hand, the highest possible service lives of the blades are achieved. It has thereby proven advantageous that the angle between the moving and stationary blades amounts to between 5° and 30°, preferably between 7° and 15°.

According to another feature of the invention, the division of the stationary cutters is a fractional multiple of the division of the moving blades. The arrangement avoids a simultaneous cut of all blades. The comminution advantageously occurs continuously. The driving torque of the apparatus remains approximately uniform.

According to another feature of the invention, the blades are formed parts of strain-hardened sheet steel which are preferably manufactured by punching. The blades manufactured in this manner can be manufactured in large piece numbers at relatively low costs, have the required cutting edges without any aftertreatment whatsoever and yield excellent service lives in operation.

The blades advantageously have the shape of an elongate rectangle with a preferably rectangular projection at their fastening end. The latter serves the purpose of securing in the built-in condition by a securing strip engaging therebehind.

A plurality of blades lying behind one another can advantageously be formed in a toothed circular arc segment. The availability of the apparatus is increased by the short blade changing times thereby achieved.

The blades preferably have a thickness of 0.3-3 mm, preferably of 0.5-1 mm. Excellent cutting capacities, given the lowest possible power consumption of the cutter apparatus, are advantageously achieved with such thin blades. In addition, the blades have, on the one hand, an elasticity in order to yield to a foreign body under given conditions and, on the other hand, they have stability adequate to the intended job. The thin blades are not blunted during operation, they are self-sharpening in a highly-advantageous fashion, since their width corresponds to a polishing edge. The cutting capacity and power consumption of the apparatus therefore remains unaltered over longer operating times, this being a great advantage over traditional hammer mills.

A further significant advantage, particularly with respect to the manufacturing costs, is also achieved in that the shape and dimensions of the moving and stationary blades are identical. This is viewed as being a development of the cutting apparatus which is essential to the invention.

It is provided, according to a further feature of the invention, that the movable and stationary blades are disposed packet-wise in rows parallel to the axis of the rotor and side-by-side as well as in a plurality of mutually parallel rows.

The clearance between respectively two moving or stationary blades of a row thereby corresponds to twice through approximately four times the thickness of a blade.

A very practical structure of the rotor which is advantageous for manufacture, assembly and for the replacement of worn blades occurs in that the body of the rotor comprises spacing plates which are clamped together between bearing spoked wheels of the rotor and in that the blades are chucked between faces of the spacing plates.

For the purpose of securing the blades, it is also provided in an advantageous feature of the invention that the blades are secured in the radial direction by securing strips engaging behind the rear projections and disposed parallel to the axis of the shaft.

Advantageous dimensions of the rotor occur with diameters between 50 and 150 cm, preferably between 80 and 120 cm, given a width of form 10 to 50 cm, preferably 20 to 30 cm.

Further advantageous features provide that an admission shaft is provided at the upper side of the housing, the shaft preferably having a rectangular cross section, and a discharge shaft having a vertical axis or, respectively, being inclined relative to the former.

For reasons of safety, a safety flap that can be opened out against a resilient restoring force is provided in the wall region tangential to the rotor. This flap protects the cutter apparatus against overloads due to parts in the feed that cannot be comminuted or that are too large.

A very practical fabrication of the housing occurs in that at least that part of the housing which is equipped with blades comprises spacing blades layered in planes perpendicular to the axis of the rotor and in that the stationary blades are chucked between faces of the spacing plates and are secured by securing strips parallel to the axis which engage behind the rear projections of the blades. It is thereby also provided that wall regions beyond the region of the stationary blades form a surface equi-distant from the rotational axis and with a slight distance from an imaginary circle described by the outer diameter of the blades of the rotor, said surface merging into the discharge shaft with a wall portion tangential to the imaginary circle.

The discharge shaft can be inclined at an acute angle relative to the vertical, whereby the angle amounts to between 10° and 20°, preferably between 12° and 17°.

It is provided in a further feature of the invention that the apparatus is developed into a transportable or mobile machine unit and, in particular, comprises devices for attachment to agricultural vehicles or, respectively, tractors.

The method according to which the apparatus functions provides that the plant matter is non-uniformly accelerated and pre-comminuted between a plurality of high-speed inner-cutters moving on a circular orbit and is finish-comminuted by a plurality of outer stationary cutters. The plant matter to be comminuted is pre-comminuted and accelerated by, preferably, cutters moving on a circular orbit, being first pre-comminuted and accelerated upon support of a wall until it is finish-comminuted in a labyrinth of cutters moving opposite one another. The shearing type of stress that the cutters exert on the plant matter leads to a very homogeneous comminution result, given a low energy expense.

In accordance with another feature of the invention, the plant matter is multiply accelerated over the course of its path by a plurality of nearly radially directed cutters moving in the manner of a circular arc and is likewise multiply decelerated by nearly radially directed stationary cutters. The decelerating and accelerating forces exerted on the plant matter convey the material through the labrinth of blades moving at high speed relative to one another. No further conveying methods whatsoever need therefore be applied to the comminution material. It is thereby a matter of a very efficient and simple manner of conveying the mealy and sticky plant matter which is otherwise difficult to convey.

During the accelerating and retarding moments exerted on the plant matter, it is also provided that the comminution thereof occurs on the basis of shearing forces between cutters and plant matter which are induced by mass inertia. As a consequence, only the plant matter and the blades advantageously act as friction partners during the comminution process. The method therefore allows the blades themselves to be disposed at a certain distance from one another. The shearing forces occur as a consequence of the inherent mass inertia of the plant matter at the cutter blades when the plant matter is decelerated or accelerated by the cutters.

Another feature of the invention provides that the comminuting shearing forces are introduced into the plant matter by cutters moving oppositely overlapping at a slight distance from one another in radial planes. This advantageously allows the cutting speed of the blades to be reduced and to therefore match the energy consumption of the method to the power curve of the engine. The self-cleaning mechanism of the cutter apparatus is thereby to be viewed as a further advantage. Another feature of the method provides that the plant matter is finish-comminuted on a path having the shape of a circular arc during a single pass. The defined path on which the plant matter is finish-comminuted prevents the comminution material from being repeatedly subjected to the comminution process for an indefinite time. The homogeneity of the comminution result is advantageously limited.

According to another feature of the invention, the discharge of the comminuted plant matter occurs pneumatically in free flight due to mass inertia. It is therewith advantageously achieved that the comminuted material can also be further pneumatically conveyed directly into storage containers.

The comminution occurs significantly more easily and uniformly in that the plant matter is pre-comminuted in a beginning gap which narrows in the manner of the circular arc.

It has proven particularly advantageous in the application of the method when the cutters are moved relative to one another with a relative speed between 50 and 150 m/sec., preferably between 80 and 120 m/sec. A particularly homogeneous comminution, given good efficiency, is achieved in the range of this method parameter.

The good efficiency allows the auxiliary drive unit of a tractor or a combine to be employed as the drive unit for the comminution. The power offering of these units advantageously corresponds to the power consumption of the comminution method and thus opens up the possibility of being able to employ the method in a mobile fashion, i.e. directly at the harvest location. The space requirement for the further transport of the comminuted material is reduced in comparison to the space requirement of the harvested material.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
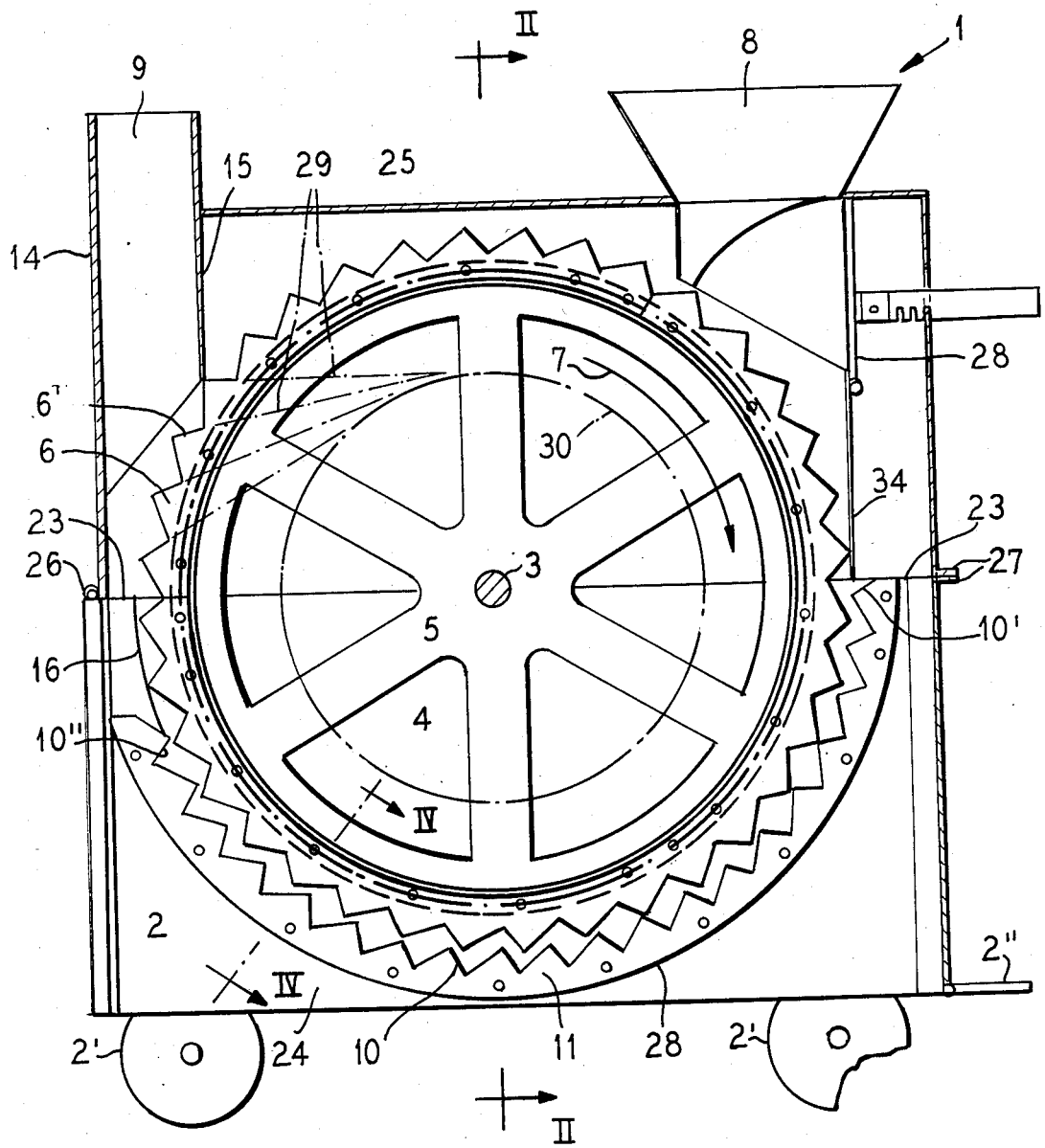
FIG. 1 is a schematic representation of apparatus constructed in accordance with the invention shown in a side view and partially in section.
Figure 6:
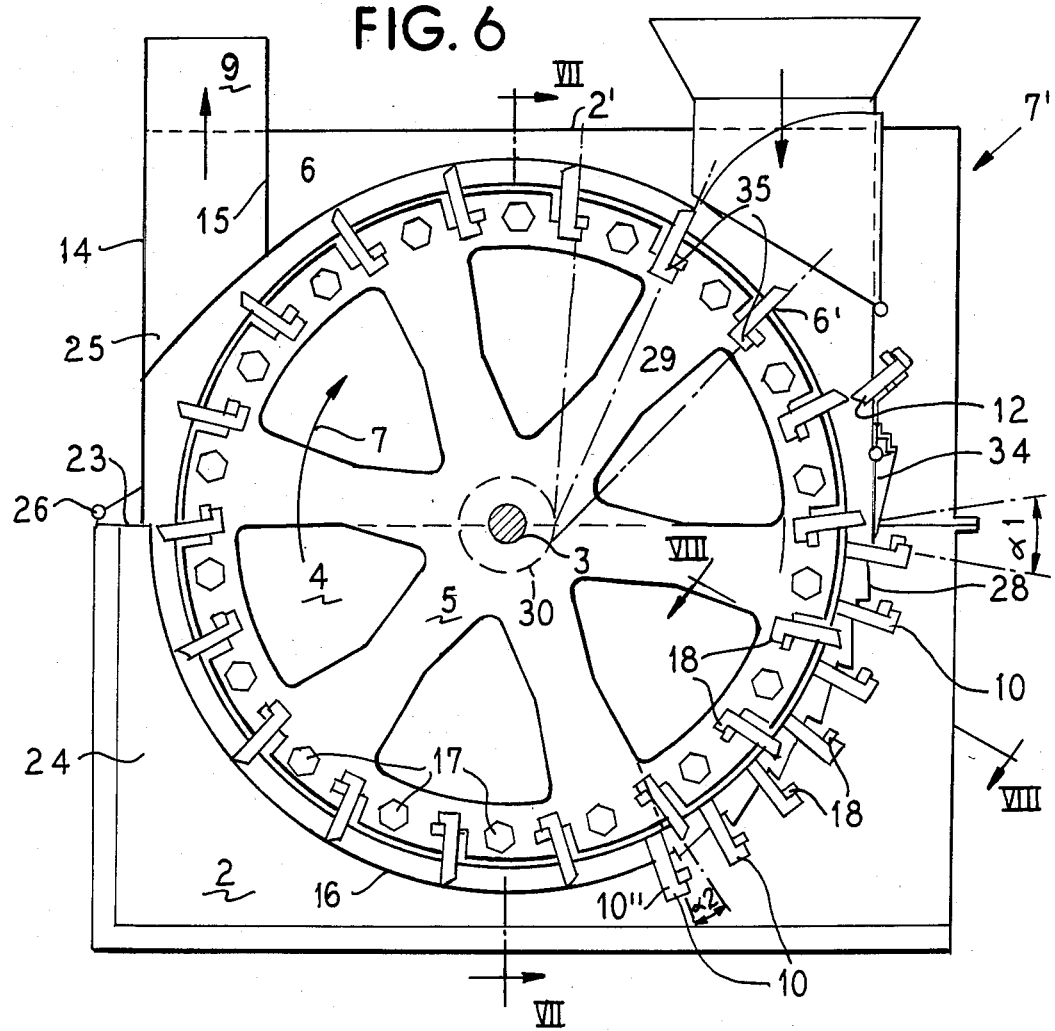
FIG. 6 is an apparatus constructed in accordance with the invention and illustrated in a side view and partially in section and showing individual blades.

Referring to FIG. 1, an apparatus 1 and as a modification according to FIG. 6 and apparatus 1' comprising a housing 2 in which a shaft 3 is seated in bearings 3' (FIG. 2) with a horizontal axis of rotation A. The shaft communicates with a drive (not shown). The apparatus also comprises a rotor 4 which is concentrically disposed around the shaft 3 by way of spoked wheels 5 which is connected rotationally-slaved to the shaft 3. At its circumference, the rotor 4 is fitted with blades 6 which are referred to below as "movable blades" 6.

Figure 3:
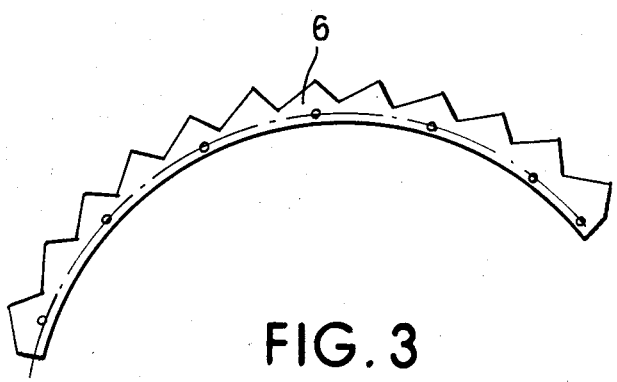
FIG. 3 is a side view of a toothed circular segment.

These are best seen in FIG. 3. The movable blades 6 move together with the rotor 4 in the rotational direction according to an arrow 7. Hemispherically stationary blades 11 oppose the movable blade 6 beyond a region of a vertical projection of an admission shaft 8 and are disposed in the region of the right-hand inner wall 28 of the housing 2. A pre-comminution by the movable blade 6 in the narrowing gap occurs in the vertical wall region above the stationary blades 11, occurring under given conditions with the cooperation of further stationary blades 11. This serves for the pre-comminution of grosser material before the same proceeds into the actual cutting region of the blade 6 in interaction with the stationary blades 11. This pre-comminution is important and advantageous because a uniform and impact-free comminution of the pre-comminuted material can occur between the blade packets as a result thereof. Just like the movable blade 6, moreover, the stationary blades 11 are disposed in rows 10, 10', 10" parallel to the rotational axis A. The initial row is referenced 10'. The final row is referenced 10". Continuing in the rotational direction 7 from there is an inner housing wall 16 which extends at the same radial spacing from the rotational axis A and at a slight distance from an imaginary circle described by the outer diameter of the movable blades 6 (FIG. 6). This wall surface 16 merges tangentially into the discharge shaft 9 formed by the wall region 14, together with the opposite wall region 15.

The position of the movable blades 6 and the stationary blades 11 relative to one another is of essential significance to the invention for an optimum cutting effect. The movable blades 6 are thereby tilted back in the direction of motion 7 such that their cutting edges 6' form tangential lines 29 to an imaginary circle 30 concentric to the rotational axis A.

The cutting edges of the stationary blades 11 form angles with the cutting edges 6' of the movable blades 6 in FIG. 6 between $\alpha 1$ at approximately 30° and $\alpha 2$ at approximately 7°.

An interaction of these cutting edges therefore evolves into a cutting function like that of a scissors.

The advantages deriving, both for the cutting effect itself and for the service lives of the cutters, are essential to the apparatus of the invention. They result in the fact that the power consumption of the apparatus is many times superior to that of the mills employed in the prior art when related to an identical comminution and quality and quantity.

Given the apparatus shown in a purely schematic fashion in the side views of FIGS. 1 and 6, the discharge shaft 9 is disposed with a vertical axis. In an expedient modification, however, it can also be disposed with an outward tilt describing an acute angle relative to the vertical.

At the horizontal parting plane 23, further, the housing 2 is divided into a lower housing region 24 and an upper housing region 25. These are pivotally connected to one another by way of a hinge 26 and held sealed on all sides with respect to one another with the flanges 27. After undoing a few screws (not shown), the upper housing region 25 can be hinged up, for example for purpose of cleaning and/or inspection, or an inspection flap (not shown) under the housing can be opened. The inside of the apparatus 1 thereby lies largely unobstructed and can be inspected.

FIG. 6 also illustrates a safety flap 34 which is spring mounted and opens against a resilient restoring force in that wall region of the admission shaft which is tangential to the rotor given, for example, inadvertently entrained stones, and thus protects the cutter apparatus against overload.

A further flap 13 which is likewise disposed in the region of the admission shaft allows mechanically supplied plant matter to be conducted past the cutter apparatus after it has been hinged into the shaft should the cutter apparatus be blocked up.

The structure of the rotor 4 can also be seen from the illustration, the rotor 4 comprising two spoked wheels 5 centrally accepted on the shaft 3 between which spacing plates 20 (FIG. 5) are disposed. The movable blades 6 are firmly clamped between the spoke wheels 5 and the spacing plates 20.

In order to secure the position given an embodiment having discrete or individual blades, securing strips 18 are inserted through corresponding recesses in the peripheral regions of the rotor 4, the securing strips engaging behind the projections (FIG. 9) of the blades and securely holding the blades in this manner, as can likewise be particularly seen in FIG. 6.

Advantageously, however, a plurality of individual blades can also be combined into toothed circular arc segments, this being shown in an exemplary fashion in FIG. 3.

Advantageously, the apparatus may be mounted on wheels 2' (partially illustrated in FIG. 1) and towed by way of a tow bar 2''.

Figure 2:
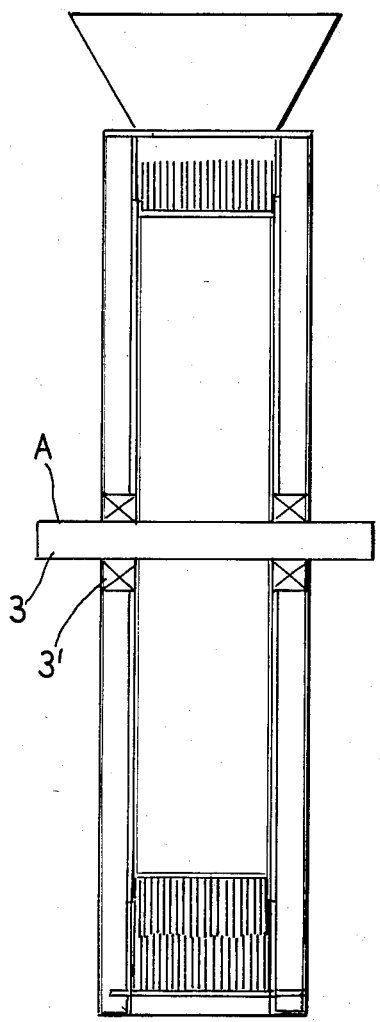
FIG. 2 is a sectional view with the apparatus of FIG. 1 taken generally along the parting line II—II of FIG. 1.
Figure 7:
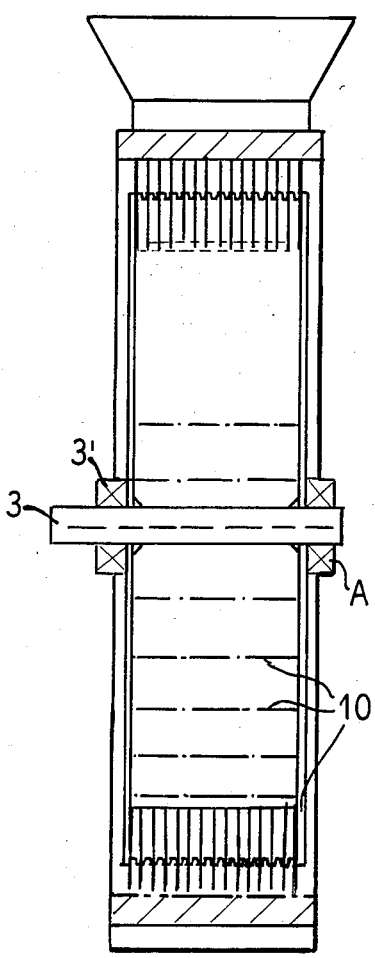
FIG. 7 is a sectional view taken along the parting line VII—VII of FIG. 6.

FIG. 2 illustrates a section corresponding to the plane of the parting line II—II of FIG. 1, whereas FIG. 7 illustrates a similar section along the parting line VII—VII of FIG. 6. Identical elements therein have been identified with identical reference characters. The illustrations of FIGS. 2 and 7, which only serve to illustrate the width relationships of the apparatus 1, are actually not in need of any further explanation. The rotor 4 shown from the side in FIGS. 1 and 6 and from the narrow end in FIGS. 2 and 7 has a diameter in a practical exemplary embodiment of 120 cm from blade tip-to-blade tip and a width of 25 cm. A 40 KW motor serves as a drive and the circumferential speed of the movable blades amounts to 85 m/sec.

Figure 4:
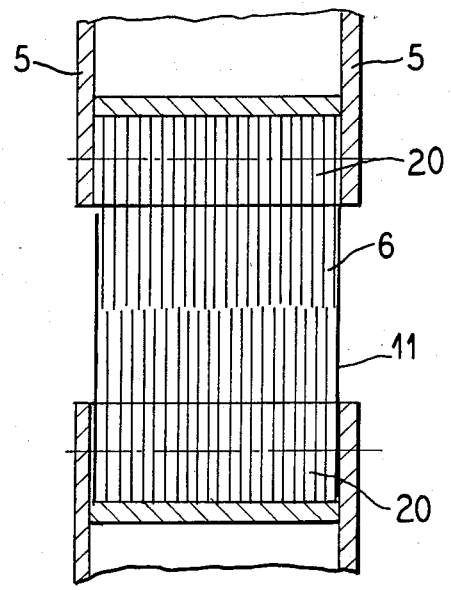
FIG. 4 is a sectional view taken through a portion of the rotor generally along the parting line IV—IV of FIG. 1, showing the blades interspaced.
Figure 5:
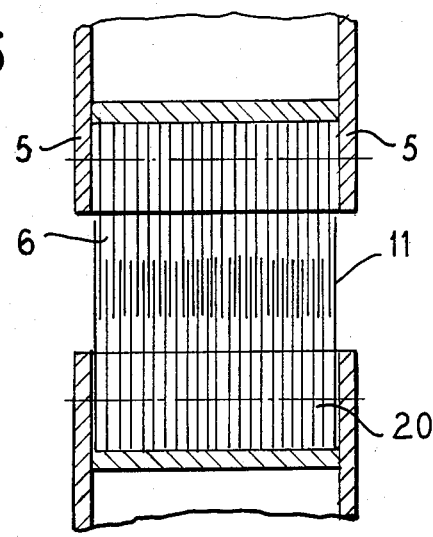
FIG. 5 is a sectional view, similar to that of FIG. 4 in which the blades overlap.

Various advantageous dispositions of the blades chucked at the periphery of the rotor 4 are illustrated in FIGS. 4 and 5. The disposition of the cooperating blades 11 can also be seen from these illustrations. Each of FIGS. 4 and 5 should be considered to be taken along the parting line IV—IV of FIG. 1 for the different blade associations, that is spaced or overlapping.

Figure 8:
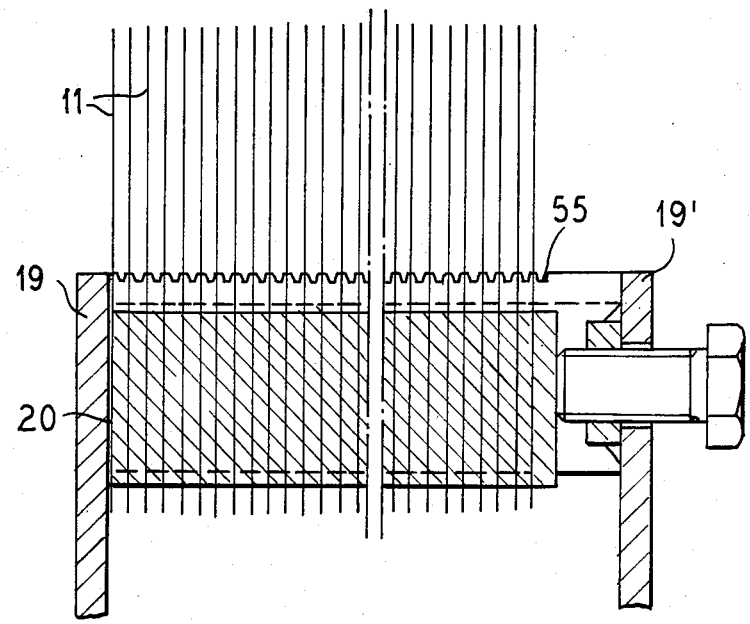
FIG. 8 is a sectional view through a portion of the rotor taken generally along the parting line VIII—VIII of FIG. 6.

The outside walls 19, 19' of the housing 2 are illustrated in FIG. 8. Similar to the rotor 4, the illustrated housing region is equipped with spacing plates 20 which are clamped together by way of bolts.

The stationary blades 11 are chucked between the spacing plates. It can be seen from FIG. 8 that, given a comb-like disposition of the stationary blades 11 and of the movable blades 6, the cooperating blades are advantageously guided in grooves 55. Contact between the blades is therefore reliably avoided.

Figure 9:
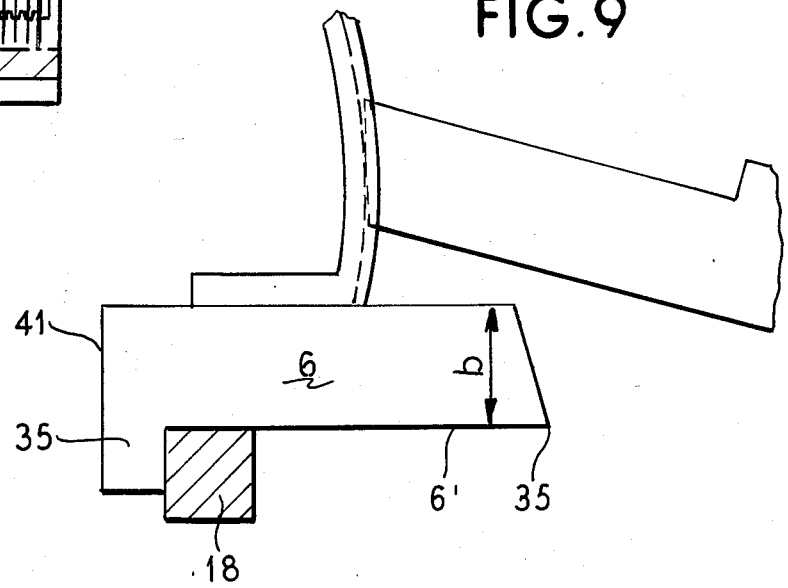
FIG. 9 is a fragmentary view of a combination of the blades of the apparatus of FIG. 6 in a side view.

Referring to FIG. 9, the shape and dimensions of a blade 6, which is designed as a discrete blade and shown approximately life-size, is illustrated. In contrast thereto, FIG. 3 illustrates a toothed circular arc segment wherein a plurality of individual blades are combined to form a punched part.

The blades are manufactured as a punched part from 0.8 mm strain-hardened sheet steel, being manufactured in one work step without after treatment. Since the blades have a thickness proceeding from their basic material which corresponds to a ground edge in blades for agricultural machinery, they can never become blunt, even in rugged operation. From the back edge 41 (FIG. 9) up to the point 36 of the blade, the dimensions of a discrete blade amount, for example, to about 100 mm, the width b amounts to, for example, 25 mm and the thickness amounts, for example, to 0.8 mm. In the mounted condition, the projection 35 is rearwardly engaged by the securing strip 18 and, as frequently mentioned above, secures the blade 6 or, respectively, 11 in its chucked position.

Although I have described my invention by reference to particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for comminuting plant matter in an apparatus including a plurality of first self-sharpening cutters forming a precomminuting zone and a portion of a comminuting zone, a plurality of second self-sharpening cutters forming, with said first cutters, the remainder of the comminuting zone, each of said first and second cutters having a thickness in the range of 0.3–3 mm, said first cutters lying along radial paths which are spaced from, parallel to, and overlappingly bypassing said second cutters, said method comprising the steps of:

feeding the plant matter into the precomminuting zone;

precomminuting and contemporaneously non-uniformly and multiply accelerating the plant matter by rotating said first cutters;

decelerating the plant matter by delivering it to said comminuting zone where it is decelerated by said second cutters;

shearing the plant matter between said first and second cutters in said comminution zone; and discharging the sheared plant matter.

2. The method of claim 1, and further comprising the step of:

discharging the comminuted plant matter pneumatically in a free-flight manner due to its mass inertia.

3. The method of claim 1, and further comprising the step of:

guiding the plant matter towards the first cutters along a path of a circularly-decreasing cross section.

4. The method of claim 1, wherein the step of rotating the first cutters is further defined as:

rotating the first cutters at a rate, relative to the second cutters, in a range of between 50 and 150 m/sec.

5. The method of claim 4, wherein the step of rotating the first cutters is further defined as:

rotating the first cutters at a rate, relative to the second cutters, in a range of between 80 and 120 m/sec.

6. The method of claim 1, wherein the step of rotating the first cutters includes the step of:

rotationally driving the first cutters with an agricultural machine.

7. Apparatus for the comminution of plant matter, comprising:
- a housing;
- a rotor mounted for rotation in said housing and including an axis of rotation;
- an intake chute in said housing for receiving plant matter to be comminuted;
- a discharge chute in said housing for the discharge of the comminuted plant matter; and
- cutter means for comminuting the plant matter including a plurality of first cutter blades and a plurality of second cutter blades, each of said cutter blades including a thickness in the range of 0.3–3 mm, said plurality of first cutter blades mounted axially spaced apart in radially extending planes at the periphery of said rotor, and said plurality of said second cutter blades mounted in said housing parallel to and axially spaced from and radially overlapping said plurality of first cutter blades to be axially bypassed by said first cutter blades and to provide a scissors cutting action.

8. The apparatus of claim 7, wherein:
said first and second cutter blades include edges which extend relative to one another at an angle between 5° and 30°.

9. The apparatus of claim 7, wherein:
said first and second cutter blades include edges which extend relative to one another at an angle between 7° and 15°.

10. The apparatus of claim 7, wherein:
said first and second cutter blades are strain-hardened sheet steel.

11. The apparatus of claim 7, wherein:
said first and second cutter blades are each in the shape of an elongate rectangle including a rectangular projection at one end for fastening.

12. The apparatus of claim 7, wherein:
each of said cutter blades includes a thickness in the range of 0.5–1 mm.

13. The apparatus of claim 7, wherein:
each of said first and second cutter blades are of identical shape.

14. The apparatus of claim 7, wherein:
said first cutter blades and said second cutter blades are mounted as packets in rows parallel to the axis of rotation side-by-side and in a plurality of mutually parallel rows.

15. The apparatus of claim 7, wherein:
said first and second cutter blades are mounted in rows spaced apart in a range of twice through four times the blade thickness.

16. The apparatus of claim 7, wherein:
said rotor comprises a pair of spoked wheels and spacing plates clamped together between said spoked wheels; and
said first cutter blades are chucked between faces of said spacing plates.

17. The apparatus of claim 7, and further comprising:
securing strips for securing said first cutter blades to said rotor; and
wherein each of said first cutter blades comprises a rectangular projection for engagement by a securing strip to secure said blade to said rotor with said securing strip disposed parallel to the axis of rotation.

18. The apparatus of claim 7, wherein:
said rotor comprises a diameter in the range of 50–150 cm.

19. The apparatus of claim 7, wherein:
said rotor comprises a diameter in the range of 80–120 cm.

20. The apparatus of claim 7, wherein:
said rotor comprises a width in the range of 10–50 cm.

21. The apparatus of claim 7, wherein:
said rotor comprises a width in the range of 20–30 cm.

22. The apparatus of claim 7, wherein:
said housing has an upper side; and
said intake chute communicates with the interior of said housing through said upper side.

23. The apparatus of claim 7, wherein:
said housing comprises an upper side; and
said discharge chute communicates with the interior of said housing through said upper side in a vertical disposition.

24. The apparatus of claim 7, wherein:
said housing comprises an upper side; and
said discharge chute communicates with the interior of said housing through said upper side in a disposition inclined with respect to vertical.

25. The apparatus of claim 7, wherein:
said housing includes a wall area adjacent said intake chute and some of said second cutter blades are disposed on said wall.

26. The apparatus of claim 7, and further comprises:
a spring-mounted safety flap in said housing adjacent said intake chute.

27. The apparatus of claim 7, wherein:
said housing comprises internal walls having arcuate edges extending behind said second blades in the direction of rotation of said rotor and slightly spaced from said rotor and forming an arcuate surface equi-distant from the axis of rotation and merging into said discharge chute with a wall portion tangential to the imaginary circle described by said first blades upon rotation.

28. The apparatus of claim 7, wherein:
said discharge chute is inclined at an acute angle relative to the vertical, said angle being the range of 10°–20°.

29. The apparatus of claim 7 wherein:
said discharge chute is inclined at an angle relative to the vertical, said angle being in the range of 12°–17°.

30. The apparatus of claim 7, and further comprising:
support means for supporting said housing for movement along the ground.

31. The apparatus of claim 30, wherein:
said support means comprises wheels for rollingly supporting said housing.

32. The apparatus of claim 30, wherein:
said housing comprises means for attachment to a vehicle so that said housing may be transported along the ground.

* * * * *

UNITED STATES PATENT AND TRADEMARK OFFICE
CERTIFICATE OF CORRECTION

PATENT NO. : 4,741,481
DATED : May 3, 1988
INVENTOR(S) : Klemens Kalverkamp

It is certified that error appears in the above-identified patent and that said Letters Patent is hereby corrected as shown below:

Column 10, line 44, "7" should read --27--.

Column 10, line 48, "7" should read --27--.

Signed and Sealed this

Twenty-fifth Day of February, 1992

Attest:

HARRY F. MANBECK, JR.

Attesting Officer

Commissioner of Patents and Trademarks